United States Patent [19]

Comeau

[11] 4,372,072
[45] Feb. 8, 1983

[54] FISHING ROD HOLDER HAVING DUAL MOUNTING CAPABILITIES

[76] Inventor: Joseph E. Comeau, 18 State Park Dr., Titusville, N.J. 08560

[21] Appl. No.: 236,737

[22] Filed: Feb. 23, 1981

[51] Int. Cl.³ .............................................. A01K 97/10
[52] U.S. Cl. .................................... 43/21.2; 43/25.2; 224/922
[58] Field of Search ................ 43/21.2, 25.2; 248/538, 248/534, 536, 530; 224/922

[56] References Cited

U.S. PATENT DOCUMENTS

| | | | |
|---|---|---|---|
| 2,803,387 | 8/1957 | Pearce | 43/21.2 |
| 3,162,970 | 12/1964 | Gould | 43/21.2 |
| 3,342,441 | 9/1967 | Danielson | 248/534 |
| 3,344,551 | 10/1967 | Chestnut | 43/21.2 |
| 4,092,795 | 6/1978 | Bryant | 43/21.2 |
| 4,150,506 | 4/1979 | McGinnis | 43/21.2 |

Primary Examiner—Nicholas P. Godici
Assistant Examiner—Marc Hodak
Attorney, Agent, or Firm—Arthur L. Plevy

[57] ABSTRACT

A fishing rod holder is capable of being placed in the sand or attached to a suitable bracket which is accommodated on the bumper of a vehicle. The holder comprises a longitudinal tubular member having a reel accommodating slot, which member is secured to a spiked member containing an anchor plate. The holder operates in a dual mode and can be either emplaced in the sand or ground or emplaced within the above described bracket.

7 Claims, 6 Drawing Figures

U.S. Patent  Feb. 8, 1983  4,372,072
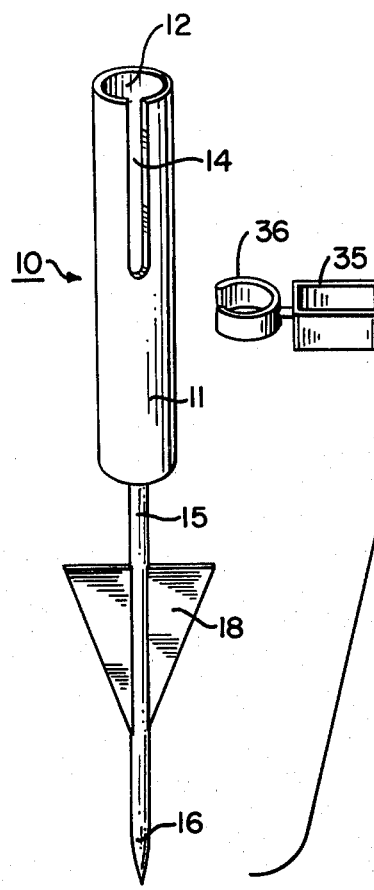
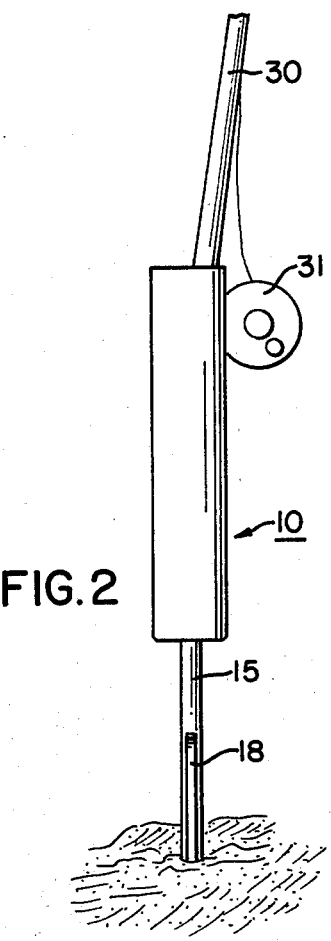
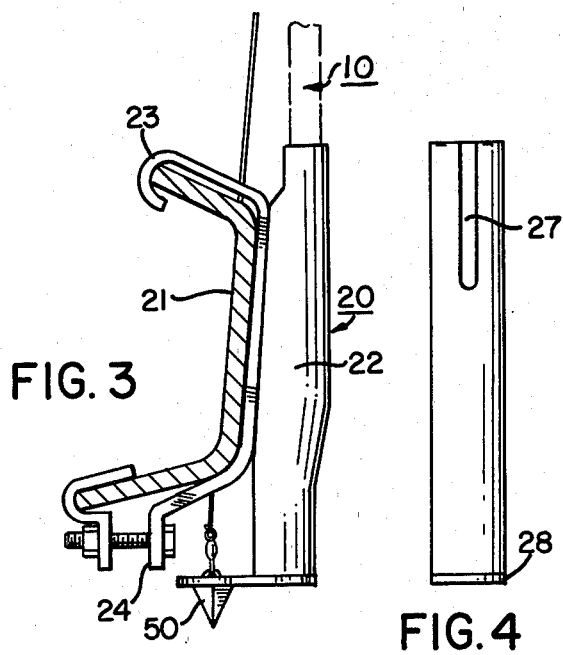

FISHING ROD HOLDER HAVING DUAL MOUNTING CAPABILITIES

BACKGROUND OF THE INVENTION

This invention pertains to a fishing rod holder and particularly to a holder that can be accommodated either in the ground or by a holder secured to the bumper of a vehicle.

The prior art is replete with a plurality of fishing rod holders structured and operated for various purposes. In any event, a most popular sport which has been receiving increased attention is the sport of surf fishing. Surf fisherman may employ vehicles such as trucks and so on and drive directly to the beach front to fish. Fishing rod holders as described in the prior art are mainly designed for supporting a rod while the holder is inserted into the ground or into the sand. As such, such holders have sometimes been referred to as sand spikes.

As above indicated, there are many examples of rod holding devices which exist in the prior art. U.S. Pat. No. 3,344,551 entitled FISHERMANS ACCESSORY issued on Oct. 3, 1967 to B. D. Chestnut depicts a fishing spike which accommodates a rod within a tubular member.

U.S. Pat. No. 4,007,902 entitled FISHING ROD HOLDER issued on Feb. 15, 1977 to G. K. Pettee depicts a holder which allows a fishing rod to be inserted in the ground or attached to the hull of a boat. The holder consists of upper and lower members positioned at acute angles with respect to one another.

U.S. Pat. No. 4,092,795 entitled FISHING POLE MOUNT AND SIGNAL issued on June 6, 1978 to I. L. Bryant depicts a holder which can be inserted in the ground or attached to a boat. The holder operates in conjunction with an electrical circuit, which circuit provides an adjustable tone signal manifesting an audible sound as to when a fish is caught.

Other patents as U.S. Pat. No. 4,198,775 entitled FISHING ROD HOLDER depict other devices for holding a fishing rod. This patent shows a unique clamping assembly which enables a fisherman to firmly clamp the rod in place while maintaining the reel in proper orientation.

As one can denote from the prior art, there are many embodiments in facilitating the holding of a rod. These devices are not adaptable to perform the dual function enabling them to be mounted on the bumper of a vehicle or inserted into the sand. The devices employ relatively complicated mechanisms to accommodate the fishing rod and are difficult and expensive to build and fabricate. The prior art devices are also capable of rotating or changing their position during operation.

It is an object of the present invention to provide an improved fishing rod holder, which holder includes means for maintaining the rod in a fixed orientation. The invention also describes a unique bracket assembly which can be mounted on the bumper of a suitable vehicle to enable a fisherman to emplace the rod therein instead of in the ground. The bumper assembly also serves as a transport for the rod holders and hence, enables the same to be accommodated by a vehicle without taking up any additional storage space.

BRIEF DESCRIPTION OF THE PREFERRED EMBODIMENT

A fishing rod holder adapted for insertion into the ground and attachment to the bumper of a vehicle having secured to said bumper a tubular bracket, comprising a longitudinal tubular member symmetrically disposed about a main axis and of a given diameter having an open top for accommodating the handle portion of a fishing rod, and a closed bottom end, said member having a slot extending from the periphery of the open top and directed relatively parallel to the main axis of said tubular member, an elongated spike member depending from said bottom end and having a relatively pointed termination remote from said bottom end and adapted to be inserted into the ground or into said tubular bracket, an anchor plate member secured to said spike member at a predetermined distance above said pointed termination, with said anchor plate adapted to be inserted into the ground when said spike is so inserted to prevent rotation of said holder when accommodating a fishing rod.

BRIEF DESCRIPTION OF THE FIGURES

FIG. 1 is a front plan view of a fishing rod holder according to this invention;

FIG. 2 is a side elevational view depicting the holder of FIG. 1 being accommodated in the ground;

FIG. 3 is a side elevational view of a bracket assembly according to this invention;

FIG. 4 is a front plan view of the bracket assembly of FIG. 3; and

FIGS. 5 and 5A depict an alternate embodiment of a bracket assembly according to this invention.

DETAILED DESCRIPTION OF THE INVENTION

Referring to FIG. 1, there is shown a fishing rod holder or sand spike 10 according to this invention. Essentially, the device 10 consists of a top elongated tubular member 11 which may be fabricated from a strong structural material such as steel, aluminum or some other suitable material which is relatively corrosion resistant. The tubular member 11 has a diameter 12 sufficient to accommodate the handle portion of a typical surf rod or other fishing rod. Located at the top portion of the tubular member is an elongated slot 14 which will accommodate a fishing reel normally associated with the rod.

Secured to the bottom portion of the tubular member 11 is an elongated spike member 15. The member 15 has a relatively sharp termination point 16 to enable a user to emplace the holder device in sand or gravel as usually found on a beach. Rigidly secured to the spike 15 is a triangular shaped anchor plate 18. The plate 18, as will be further described, functions to anchor the holder 10 in the sand or ground and to prevent the undue rotation of the same when a rod is emplaced within the accommodating aperture of the holder 10.

Shown to the left of the holder 10 is a box-like configuration 35 having a front clamp 36. The clamp 36 is dimensioned to encircle a portion of the outer diameter of the tubular member 11 to thus affix the box 35 to the tubular member at any desired location. The box 35 may contain a cover and is employed for accommodating bait or other accessories that a fisherman may employ.

Referring to FIG. 2, there is shown a simplified view of a fishing rod 30 having a reel 31 being accommodated by the holder depicted in FIG. 1. As can be seen from FIG. 2, the anchor plate 18 as coupled to the spike member 15 has its lower peripheral end inserted into the sand and functions to prevent the undue rotation of the holder 10 when the same is accommodating a rod 30. The anchor plate 18 thus provides great facility in that wind or pulling on the line will not change the orientation of the apparatus. As one can thus ascertain from FIG. 2, the holder 10 is capable of being accommodated and inserted in the ground via the spike member 15.

Referring to FIG. 3, there is shown a side elevational view of a bracket 20 which is secured to the front bumper 21 of a suitable vehicle. The bracket 20 consists essentially of a tubular member 22 which is attached to a flexible bracket 23. The bracket 23 has a curvilinear top section which is adapted to mount over a conventional flange included at the top portion of the bumper 21. An adjustable bottom depending bracket section 24 is shown secured to the bottom portion of the bumper 21 to hence, hold the bracket firmly in place.

FIG. 4 depicts a front view of the tubular member 22 coupled to the bracket. The tubular member 22 may have an accommodating slot 27, into which slot the anchor plate 18 may be positioned and hence, the bracket assembly 20 may be employed to accommodate the holder 10 during transport or to accommodate the holder if the vehicle is near the surface line and hence, to avoid replacing the spike 15 into the ground.

Both the brackets 20 and 45 of FIG. 3 and FIG. 5 contain a bottom plate as plate 28 in FIG. 3 and plate 42 in FIG. 5. The plates are secured to the bottom surface of the respective tubular member and have an extending flange containing a slot as 29 and 48. The slots or keyways are employed to restrain the lead sinker 50 which is normally employed at the end of a fishing line. Thus, when the brackets 22 and 45 are accommodating the sand spike unit 11, the unit 11 is carrying a rod 30, the line having a sinker 50 is emplaced with tension into the slot as 29 and 48 to immobilize both the rod due to tension and to further restrain the sinker 50 from moving and damaging the vehicle. In this manner, the entire assembly can be transported by the vehicle with assurance of a secure and compact arrangement.

Referring to FIG. 5, there is shown an alternate embodiment of a bracket assembly which may be mounted on the bumper of a vehicle. The bracket assembly 40 has a top portion 41 for coacting with the top of a vehicle bumper and a bottom depending portion 42 for coacting with the bottom portion of the vehicle bumper.

The bracket as depicted in FIG. 5 consists of a central member 45 having two depending flanges 46 and 47. Each flange as 46 and 47 has a central aperture 48 for accommodating the shaft of the spike member 15.

While the exact constructional features have not been described in detail, it is noted that the holder 10 of FIG. 1 is fabricated from a strong constructional material as are the associated components. As such, the anchor plate 18 may be welded to the shaft 15 or secured thereto by other suitable means such as rivets, fasteners or other devices employed in metal fabrication. Such techniques for constructing such apparatus are well known in the art.

As one can ascertain from the above described specification, there will be many alternate embodiments which would be obvious to those skilled in the art upon reading the above noted specification. All such embodiments are deemed to be encompassed within the spirit and scope of this invention as more particularly defined in the claims appended hereto.

I claim:

1. The combination of a fishing rod holder adapted to be inserted into the ground, and a bracket for mounting said holder to a vehicle bumper, the fishing rod being of the type having a reel secured to the handle end of said rod and having a fishing line carrying a sinker attached thereto, said holder comprising;

a longitudinal tubular member symmetrically disposed about a main axis of a given diameter having an open top for accommodating the handle portion of a fishing rod, and a closed bottom end, with a slot extending from the periphery of said open top and directed relatively parallel to the main axis of said tubular member, with said slot adapted to accommodate the reel of said rod, an elongated spike member depending from said bottom end and having a relatively pointed termination remote from said bottom end, an anchor plate member secured between said tubular member and said spike member at a predetermined distance above said pointed termination, said bracket comprising;

a central section with integral extending top and bottom arms for coacting with the top and bottom portions of a bumper for securing the same thereto, and having a spike accommodating means secured to said central section for accommodating said elongated spike, a sinker securing means coupled to said bracket for accommodating a sinker secured to said fishing line whereby when said handle of said rod is emplaced in said rod holder and said elongated spike is emplaced in said bracket said sinker securing means accommodates said sinker to exert a force via said line to firmly hold said rod holder and said rod in position on said bumper.

2. The fishing rod holder according to claim 1 wherein said spike accommodating means comprises a tubular member.

3. The fishing rod holder according to claim 1 wherein said spike accommodating means comprises a first and second flanges each having a coaxial aperture for insertion therethrough of said elongated spike.

4. The fishing rod holder according to claim 1 wherein said sinker securing means comprises a plate coupled to said bracket and having a keyed slot for accommodating said fishing line above said sinker to cause said sinker to abut against said plate to exert said force.

5. The fishing rod holder according to claim 1 wherein said anchor plate comprises a planar member of a triangular configuration with the apex of said triangle directed along the main axis of said spike member.

6. The fishing rod holder according to claim 1 wherein said longitudinal tubular member is a cylindrical member having a circular cross section.

7. The fishing rod holder according to claim 1 further including a box-like member having a projecting bracket secured to one side, with said projecting bracket adapted to coact with the outer surface of said tubular member.

* * * * *